July 5, 1955  R. W. WILSON  2,712,278
IMPLEMENT FRAME TRIP
Filed April 21, 1952  2 Sheets-Sheet 1
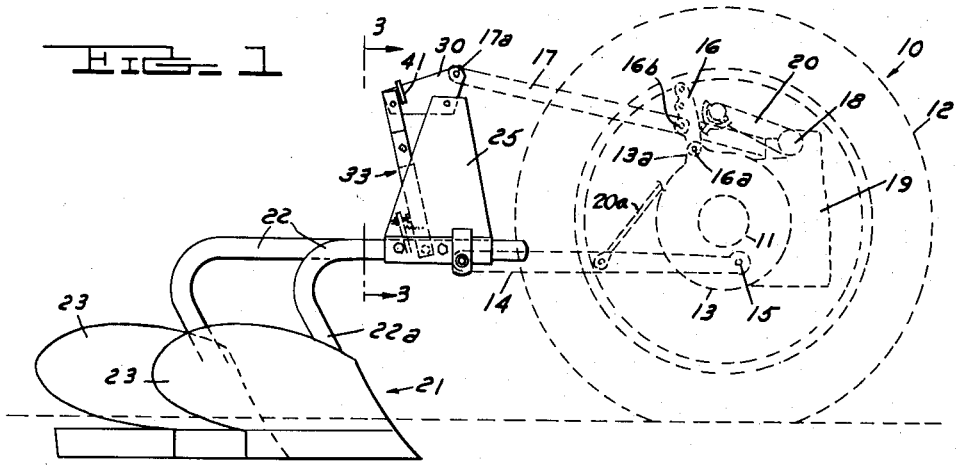
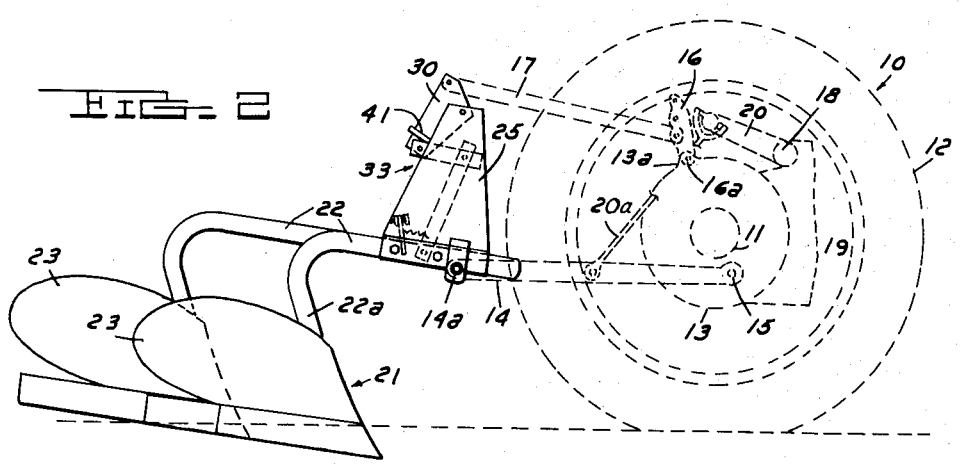
INVENTOR.
RAYMOND W. WILSON
BY
ATTORNEYS

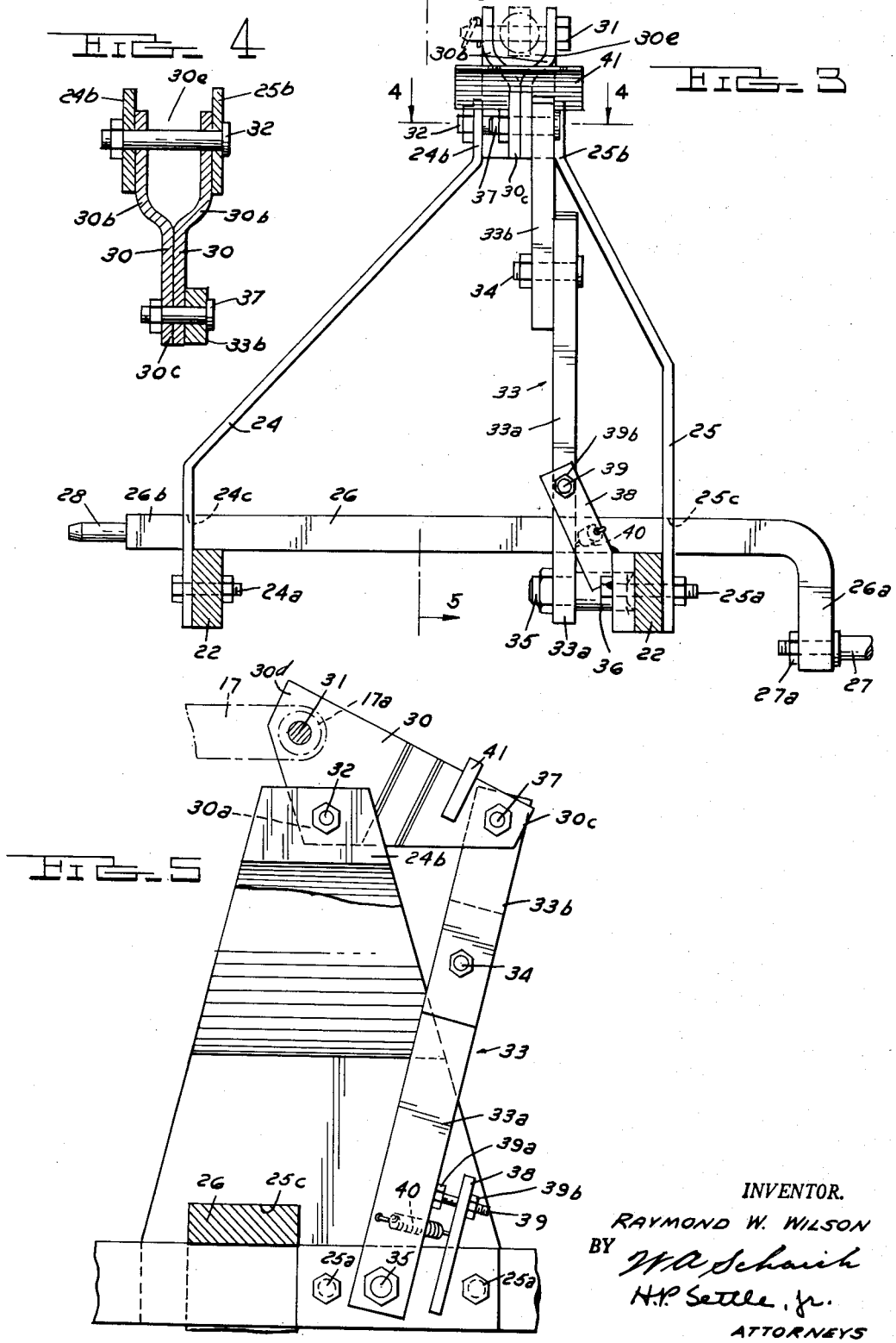

United States Patent Office 2,712,278
Patented July 5, 1955

2,712,278

IMPLEMENT FRAME TRIP

Raymond W. Wilson, Ferndale, Mich., assignor, by mesne assignments, to Ford Motor Company, Dearborn, Mich., a corporation of Delaware Application April 21, 1952, Serial No. 283,299

6 Claims. (Cl. 97—47.8)

This invention relates to a device responsive to excessive draft loads for effectively shortening the top link of a three point hitch linkage for tractors to relieve overstressing of the implement and/or tractor.

Tractor mounted implements are now in common use and well liked, primarily because of the ease in transporting such implements to and from the field. One well known make of tractor has a pair of power lifted hitch links universally connected to the tractor rear axle housing at laterally spaced points and a top link similarly connected to the tractor, but at a central vertically spaced point above the hitch links. These links define what is commonly called the three point hitch linkage.

The implements mountable on such linkage generally have laterally spaced pins which receive the trailing ends of the hitch links. A so-called upstanding A frame is provided on the implement and the trailing end of the top link is pivotally connected thereto. It is thus quite obvious that the implement is relatively rigidly mounted on such linkage so far as longitudinal displacement relative to the tractor is concerned.

In most instances, implements so mounted on the tractor are quite satisfactory in operation and there will be no overstressing of the implement or the tractor linkage and related parts in normal usage. Heavy draft implements, particularly plows, operate in soil at a substantial depth and the earth working element thereof is prone to strike hidden obstructions. If the hidden obstructions are large enough, the earth working element will generally hang up on such obstructions and cause a complete stoppage of the tractor. If the tractor is moving at a relatively high rate of speed, the shock forces attendant the encounter with the hidden obstructions are generally of such magnitude as to inflict serious damage to the implement and/or the tractor.

The relatively rigid mounting of the implement on the hitch linkage is, of course, the primary reason why the shock forces, resulting from striking an obstruction, cause overstressing of the affected part of both implement and tractor, even beyond their elastic limits in some cases. Shortening of the top link just prior to the maximum desirable loading or stressing of the implement would permit the implement to tilt upwardly and forwardly about the point of connection of the hitch links to the implement, thereby permitting the earth working element to rotate rearwardly and upwardly to clear the obstruction, or at the very least to break the longitudinally rigid connection of the implement to the tractor to immediately relieve the overstressed condition.

Accordingly, it is an object of this invention to provide a device for effectively shortening the top link of a three point tractor hitch linkage in response to excessive draft forces to substantially eliminate overstressing of the components of an implement mounted on such linkage.

Another object of this invention is to provide a device to prevent overstressing of tractor mounted implements, which is operable in response to overload.

Another object of this invention is to provide an improved implement frame shock relieving device for mounted implements which substantially reduces the harmful effects of shock loads on the implement parts.

A further object of this invention is to provide an improved overload relief device for mounted type implements for tractors having the so-called three point implement linkage which effectively shortens the tractor top link to permit tilting of the implement frame for reduction of the overload shocks on the implement frame.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side elevational view of a plow mounted upon the trailing hitch linkage of a tractor incorporating the improved frame trip device constructed in accordance with this invention;

Figure 2 is a view similar to Figure 1 but showing the frame in the tripped position;

Figure 3 is an enlarged scale sectional view taken along the plane 3—3 of Figure 1;

Figure 4 is a sectional view taken along the plane 4—4 of Figure 3; and

Figure 5 is a sectional view taken along the plane 5—5 of Figure 3.

As shown on the drawings:

In Figure 1 there is shown the rear end portion of a tractor 10 having a rear axle housing 11. Rear axle housing 11 has a pair of wheels 12 respectively journaled on its ends. A differential housing 13 is provided centrally of the axle housing 11. A pair of rearwardly extending hitch links 14 are connected at laterally spaced points 15 to the tractor rear axle housing 11. An upstanding lug 13a is provided on the upper rear portion of the differential housing 13 and a rocker member 16 is pivotally secured thereto as by a pin 16a. A tractor top link 17 has its front end pivotally connected as at 16b to the rocker member 16. A transverse rock shaft 18 is journaled in the upper portion of the center housing 19 of tractor 10 and a pair of rock arms 20 are secured to the ends of the rock shaft 18. A pair of links 20a respectively connect the ends of the rock arms 20 to the medial portions of the hitch links 14. The rock shaft 18 is rocked by a built-in hydraulic mechanism (not shown) for vertically lifting the hitch links 14. All of the above described elements are conventional parts of the well-known Ford tractor and hence further description thereof is not believed necessary.

In Figures 1 and 2 there is shown a two bottom plow 21 mounted on the trailing hitch links 14 of tractor 10. Plow 21 comprises a pair of laterally spaced, longitudinally disposed plow beams 22. The plow beams 22 are maintained in laterally spaced relationship by the usual cross braces (not shown). On the depending rear end portions 22a of the plow beams 22, a pair of plow bottoms 23 are respectively mounted for tilling the soil. A pair of upstanding side plates 24 and 25 are respectively mounted on the forward end portions of the plow beams 22. Bolts 24a and 25a respectively secure the lower end portions of the side plates 24 and 25 to the respective plow beams 22. Each of the side plates 24 and 25 is of substantially triangularly shaped configuration and such side plates are bent to slope inwardly and upwardly as best shown in Figure 3. The upper end portions 24b and 25b are respectively bent upwardly into laterally spaced parallel relationship for a purpose to be later described.

The lower end portions of the side plates 24 and 25 are respectively transversely apertured, as shown at 24c and 25c. The apertures 24c and 25c are disposed just above the plow beams 22 and such apertures receive a transverse cross shaft 26. The cross shaft 26 is secured in a desired position of transverse adjustment relative to the plow beams 22 by a suitable screw adjusting device (not shown). The right hand end of cross shaft 26 is bent downwardly at right angles, as shown at 26a, and such downwardly bent portion has a horizontal mounting pin 27 secured within a transverse hole in such portion. A nut 27a screwed onto the threaded inwardly projecting end of the pin 27 secures such pin against displacement. The other end 26b of cross shaft 26 has a horizontal mounting pin 28 shrunk into a suitable horizontal hole (not shown) provided in the end 26b of cross shaft 26. For a more detailed description of the plow 21 and the side plates 24 and 25 which define a so-called A-frame and for mounting and adjustment of the cross shaft 26, reference may be had to the co-pending patent application of Ralph C. Frevik, filed January 5, 1950, Serial No. 136,885, entitled Adjusting Mechanism for Farm Implements, and assigned to the assignee of this application.

The trailing ends of the hitch links 14 have apertured spherical, universally swiveling connectors which permit mounting such trailing ends of the hitch links on the mounting pins 27 and 28 provided on the cross shaft 26. The trailing end 17a of the tractor top link 17 is also provided with a spherical apertured connector. The trailing end 17a of top link 17 is pivotally connected between a pair of obtuse triangularly shaped plates 30 as will now be described. The triangular plates 30 lie contiguous to one another at their rear apex 30c, as best shown in Figure 4. The medial portions of triangular plates 30 are laterally offset, as shown at 30b, thereby defining a forwardly facing opening 30e. 30e receives the trailing end 17a of top link 17 therebetween. A transverse pin 31 provided in the upper apex 30d of the triangular plates 30 effects pivotal connection of the trailing end 17a of top link 17 to such plates. A transverse pin or bolt 32 is respectively inserted through aligned transverse apertures in the upper end portions 24b and 25b of side plates 24 and 25 and through a suitable transverse aperture in the apex 30a of triangular plates 30. The triangularly shaped plates 30 define in effect a bell crank lever or rocker for a purpose to be later explained.

A toggle linkage 33 comprising a lower arm portion 33a and an upper arm portion 33b is provided to transmit the upward component of force from the soil reaction of the plow bottoms 23 to the bell crank lever or rocker 30 and hence to the top link 17. Toggle 33 may therefore also be called a force transmitting linkage. The two arm portions 33a and 33b of toggle linkage 33 have their ends pivotally connected by a transverse bolt 34, as best shown in Figures 3 and 5. The lower end of the arm portion 33a is pivotally connected to the right hand plow beam 22, as best shown in Figure 3, by a horizontally disposed bolt 35. The arm 33a is laterally spaced from the right hand plow beam 22, inwardly therefrom, by a tubular spacer 36 which surrounds the bolt 35. The upper end of arm 33b is pivotally secured by a bolt 37 to the remaining apex 30c of the bell crank lever 30. Pivot points 37, 34 and 35 are in substantial lineal alignment during use and prior to the toggle 33 being collapsed at pivot 34 by over stress.

As best shown in Figures 3 and 5, a toggle trip member 38 is secured by welding to the right hand plow beam 22. The trip member 38 is a bar-like member and is positioned to lie rearwardly of the arm 33a of toggle 33 and is substantially parallel to toggle linkage 33 when such member is in the position shown in Figures 1 and 5. An adjustable contact member 39, such as a bolt, is threadably secured to the upper end of the member 38. The bolt head 39a contacts the rear edge of the arm 33a. A jam nut 39b secures the bolt 39 in a selected position of adjustment as will be later described. A tension spring 40 has its ends respectively suitably secured to the arm 33a and to the toggle trip member 38. A transverse bar like stop 41, secured as by welding to the triangular shaped bell crank lever 30, effectively limits the pivotal movement of such bell crank lever as will be presently described.

Operation

In Figure 1 the plow 21 is positioned for plowing. In such figure it will be noted that the toggle arms 33a and 33b are in extended alignment and the contact member 39 bears against the rear edge of the arm 33a of such toggle. With the plow bottoms 23 in plowing position, the toggle 33 will remain in its extended position with pivots 37, 34 and 35 in substantial lineal alignment, as shown in Figure 1, so long as the draft forces on the plow do not exceed normal values. With the elements of this device so arranged, the soil reaction forces on the plow will be transmitted to the top link 17 in the usual manner to place such top link in compression to resist rotation of the plow 21 about the hitch links 14. In the event that the plow bottoms strike a relatively unyielding obstruction in the soil, the draft load will be immediately increased. The toggle 33 will tend to resist the shock load imparted to the plow up to the point where such load exceeds a certain safe value, whereupon a resilient deformation of the frame takes place and at a predetermined degree of magnitude will result in the collapse of the toggle linkage by operation of trip member 38 to permit the upper end of the A-frame, defined by the side plates 24 and 25, to move forwardly (as shown in Figure 2), thereby permitting the plow bottoms to raise out of the ground somewhat and thereby relieve the shock load on the entire plow frame. Only the slightest inward movement of pivot point 34 out of lineal alignment with pivots 37 and 35 is required to effect this immediate collapse.

When the plow bottoms encounter an obstruction so as to increase the draft load, there is an upward deflection of the rear end of the plow beams 22 which causes the toggle trip member 38 to rotate forwardly. As the bolt 39 is in contact with the arm 33a, such arm will then be forced to move forwardly to effect collapsing of toggle 33. The collapse of toggle linkage 33 is also assisted by the forward inertia of the components of and the slight deflection inherent in such linkage. The stop 41 limits the pivotal movement of the bell crank lever or rocker 30 in a counterclockwise direction, as best shown in Figure 2, thereby limiting the extent of tilting of the plow 21. The effect of collapsing the toggle linkage 33 is to effectively shorten the length of the top link 17, which thereby permits tilting of the plow frame 21, in order to reduce the shock effects on the plow. It will be noted that the sensitivity of the toggle linkage 33 to shock loads may be conveniently varied by longitudinal adjustment of the bolt contact member 39. The toggle linkage 33 is conveniently reset to its extended position shown in Figure 1 by either raising the plow by effecting lifting of the hitch links 14 or simply backing up the tractor.

It is, therefore, apparent that an unusual degree of reliability of operation is provided by the described overload release mechanism, inasmuch as the distortion of the stressed element is utilized to initiate the release action.

Reference may be had to the copending application of Rudolph J. Altgeld filed October 3, 1950, for Overload Device for Implements, bearing Serial No. 188,235, now Patent No. 2,690,111, and assigned to the assignee of this application, for a disclosure of related subject matter.

From the foregoing description, it is clearly apparent that there is here provided a device which effectively reduces damage to an implement mounted on the so-called three point hitch linkage of a tractor resulting from shocks usually due to striking an obstruction in the soil. While the implement attached to the tractor linkage is not broken away from such linkage, the implement frame is permitted to tilt by effectively shortening the tractor top link. Such tilting occurs in response to an excessive draft loading on the implement, thereby relieving the stressed parts before serious damage will be sustained by the implement and/or the tractor.

It will, of course, be understood that various details of construction may be varied through a wide range without departing from the principles of this invention and it is, therefore, not the purpose to limit the patent granted hereon otherwise than necessitated by the scope of the appended claims.

I claim:

1. For use with a tractor having a pair of laterally spaced power lifted hitch links and a top link vertically spaced above the hitch links; a plow frame having a plow beam, a pair of upstanding plate members on said plow frame defining an A frame, a cross shaft transversely slidably mounted in said side plate members, means for respectively mounting the trailing ends of the hitch links on the ends of said cross shaft, a rocker member pivotally mounted at the upper end portion of said A frame, said rocker member having a rearwardly extending end portion, means for pivotally mounting the trailing end of the top link to said rocker member at a point spaced substantially vertically above the pivot point of said rocker, a toggle comprising a pair of arms having their one ends pivotally connected together, means for pivotally connecting one of said arms to said rearwardly extending portion of said rocker member, means for pivotally connecting said other arm to said plow frame, said toggle arms normally being in aligned extended relationship for transmitting the upward component of draft forces to the top link, a trip member mounted on said plow beam and being constructed and arranged to contact the rear edge of one of said toggle arms, said trip member being moved forwardly in response to excessive upward deflection of said plow beam to effect collapse of said toggle, whereby said rocker is so rotated as to effectively shorten the top link to permit the rear end of said plow frame to tilt upwardly.

2. The combination defined in claim 1, including adjustable length means on said trip member for contacting one of said toggle arms, thereby permitting variation of the amount of distortion of said beam required to release said toggle.

3. The combination defined in claim 2 wherein said adjustable means comprises a bolt transversely threadably mounted on said trip member, and a cooperating nut on said bolt for locking said bolt in a selected position of adjustment relative to said trip member.

4. The combination defined in claim 1 plus stop means in said rocker member engageable with said A frame for limiting the tilting of said plow frame.

5. For use with a tractor having a pair of laterally spaced power lifted hitch links and a top link vertically spaced above the hitch links; an implement comprising a tool supporting frame, means for mounting the hitch links at laterally spaced points on said frame, an upstanding member on said frame, a rocker member pivotally mounted on said upstanding member, means for pivotally mounting the trailing end of the top link on said rocker member, a toggle having its ends respectively connected to said rocker member and said tool supporting frame and normally positioned in dead-center relationship, and trip means on said frame positioned adjacent said toggle and movable upon deflection of the frame into engagement with said toggle to effect collapse thereof, whereby the toggle and top link connection is effectively shortened to permit said frame to tilt.

6. For use with a tractor having a pair of laterally spaced, lower hitch links and a central top link, a ground working implement having a frame pivotally attachable to said lower hitch links, whereby ground reaction forces on said implement tend to pivot said implement in a vertical plane about said hitch links, a rocker member pivotally mounted on said frame and having a pivotal connection with the tractor top link, a normally rigid, collapsible force transmitting member connected between said frame and said rocker, thereby rigidifying said rocker with respect to said frame so that ground reaction forces on said implement produce stressing and deflection of said frame, and means for collapsing said force transmitting member, including an actuating element shiftable by a predetermined degree of said deflection of said frame.

References Cited in the file of this patent

UNITED STATES PATENTS

| | | |
|---|---|---|
| 418,300 | Wilson | Dec. 31, 1889 |
| 2,405,980 | Sands et al. | Aug. 20, 1946 |
| 2,483,565 | Strandlund | Oct. 4, 1949 |
| 2,487,955 | Todd | Nov. 15, 1949 |
| 2,573,221 | Romig | Oct. 30, 1951 |
| 2,575,622 | Fraga | Nov. 20, 1951 |